(12) United States Patent
Suzuki et al.

(10) Patent No.: US 7,753,452 B2
(45) Date of Patent: Jul. 13, 2010

(54) HEADRESTS FOR VEHICULAR SEATS

(75) Inventors: Akinori Suzuki, Aichi-ken (JP); Hideyuki Ozeki, Aichi-ken (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 12/259,612

(22) Filed: Oct. 28, 2008

(65) Prior Publication Data
US 2009/0160226 A1    Jun. 25, 2009

(30) Foreign Application Priority Data
Dec. 25, 2007    (JP) .............................. 2007-331951

(51) Int. Cl.
A47C 7/36    (2006.01)
(52) U.S. Cl. .................................... 297/408
(58) Field of Classification Search ................ 297/391, 297/61, 403–410; 403/294, 326
See application file for complete search history.

(56) References Cited

U.S. PATENT DOCUMENTS

| | | | | |
|---|---|---|---|---|
| 4,637,655 A | * | 1/1987 | Fourrey et al. | 297/410 |
| 4,733,987 A | * | 3/1988 | Tomlinson et al. | 403/326 |
| 5,681,079 A | * | 10/1997 | Robinson | 297/61 |
| 7,422,280 B2 | * | 9/2008 | Brockman | 297/216.12 |
| 2005/0067874 A1 | * | 3/2005 | Kamrath et al. | 297/408 |
| 2008/0238173 A1 | * | 10/2008 | Sutter et al. | 297/391 |

FOREIGN PATENT DOCUMENTS

JP    4-44130 Y2    10/1992

OTHER PUBLICATIONS

U.S. Appl. No. 12/210,449 to Furukawa et al., which was filed on Sep. 15, 2008.
U.S. Appl. No. 12/210,529 to Furukawa et al., which was filed on Sep. 15, 2008.

* cited by examiner

Primary Examiner—Milton Nelson, Jr.
(74) Attorney, Agent, or Firm—Greenblum & Bernstein P.L.C.

(57) ABSTRACT

A headrest for a vehicular seat has a base member, a headrest main body and a cable. The base member has a stay held by a side of a seat back. The headrest main body is movably attached to the base member. The cable is pulled when the headrest main body is moved relative to the base member. The cable includes an outer cable and an inner cable inserted to the outer cable. The outer cable is attached with a cap at an end portion thereof. A fixing structure for fixing the cap to an end portion of the stay is provided between the cap and the end portion of the stay. And the inner cable penetrates a shaft hole of the stay by exceeding the outer cable and is moved relative to the outer cable and the stay by being pulled when the headrest main body is moved.

10 Claims, 6 Drawing Sheets

HEADRESTS FOR VEHICULAR SEATS

This application claims priority to Japanese patent application serial number 2007-331951, the contents of which are incorporated herein by reference.

BACKGROUND OF THE INVENTION

1. Field of the Invention

The present invention relates to a headrest attached to an upper side of a seat back of a vehicular seat.

2. Description of the Related Art

Prior headrests have included a base member, a headrest main body and a cable (refer to Japanese Utility Model Publication No. H04-44130). The base member includes a stay that is held by a seat back. The headrest main body is movably attached to the base member. The cable is pulled when the headrest main body is moved. The cable includes an outer cable and an inner cable inserted to the outer cable. According to the inner cable, one end side is connected to a lock release lever provided at inside of the headrest and other end portion thereof is connected to an operating lever provided on a side of a seat. Therefore, by operating the operating lever, the lock release lever is inclined to a lock release position by the inner cable, thereby the headrest main body is made to be inclinable relative to the base member.

However, an end portion of the outer cable is generally fixed by utilizing a comparatively large bracket. Further, a location of attaching the bracket needs to be a location having a predetermined rigidity, and therefore, the location is disposed at inside of the headrest main body or inside of the seat back. Thus, there is needed a headrest for a vehicular seat capable of easily fixing the end portion of the outer cable without using the bracket of the background art or the like.

SUMMARY OF THE INVENTION

One aspect of the present invention can include a headrest for a vehicular seat including a base member, a headrest main body and a cable. The base member has a stay held by a side of a seat back. The headrest main body is movably attached to the base member. The cable is pulled when the headrest main body is moved relative to the base member. The cable includes an outer cable and an inner cable inserted to the outer cable. The outer cable is attached with a cap at an end portion thereof. A fixing structure for fixing the cap to an end portion of the stay is provided between the cap and the end portion of the stay. And the inner cable penetrates a shaft hole of the stay by exceeding the outer cable and is moved relative to the outer cable and the stay by being pulled when the headrest main body is moved.

Therefore, the end portion of the outer cable is fixed to the end portion of the stay. The stay is provided with a rigidity for supporting the headrest relative to the seat back. Thus, the end portion of the outer cable can be fixed stably without using the bracket or the like of the background art. Further, the end portion of the outer cable can be fixed easily in comparison with the prior art configuration where it is fixed to inside of the headrest. Further, the inner cable penetrates the stay by extending from the outer cable. Therefore, a behavior of pulling the inner cable is stabilized and an operability of the headrest is promoted.

DETAILED DESCRIPTION OF THE INVENTION

Each of the additional features and teachings disclosed above and below may be utilized separately or in conjunction with other features and teachings to provide improved headrests for vehicular seats. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

Figure 1:
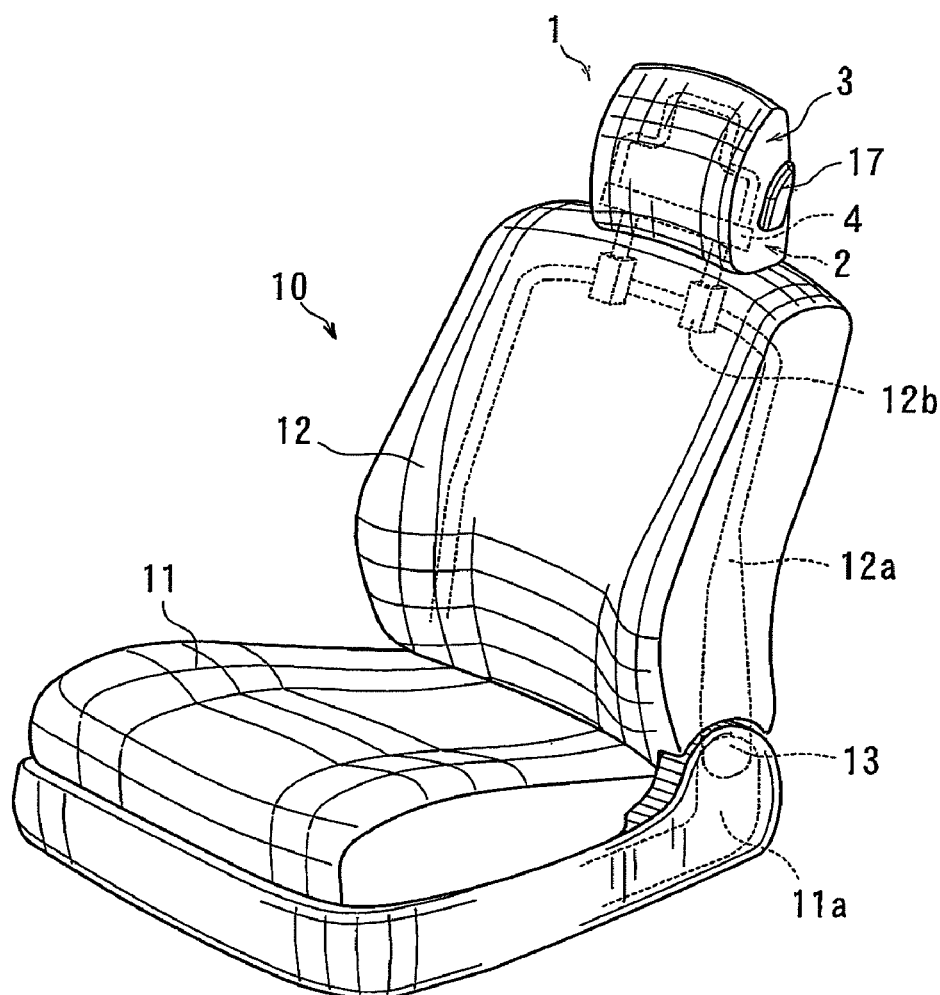
FIG. 1 is a perspective view of a vehicular seat of the present invention.

As shown in FIG. 1, a vehicular seat 10 includes a seat cushion 11, a seat back 12 and a headrest 1. The seat cushion 11 and the seat back 12 includes frames 11a, 12a. The frame 12a is connected to the frame 11a to be able to adjust an angle by a reclining apparatus 13. A pair of tubular holders 12b are attached to an upper side portion of the frame 12a, and the headrest 1 is movably attached to the holder 12b.

Figure 2:
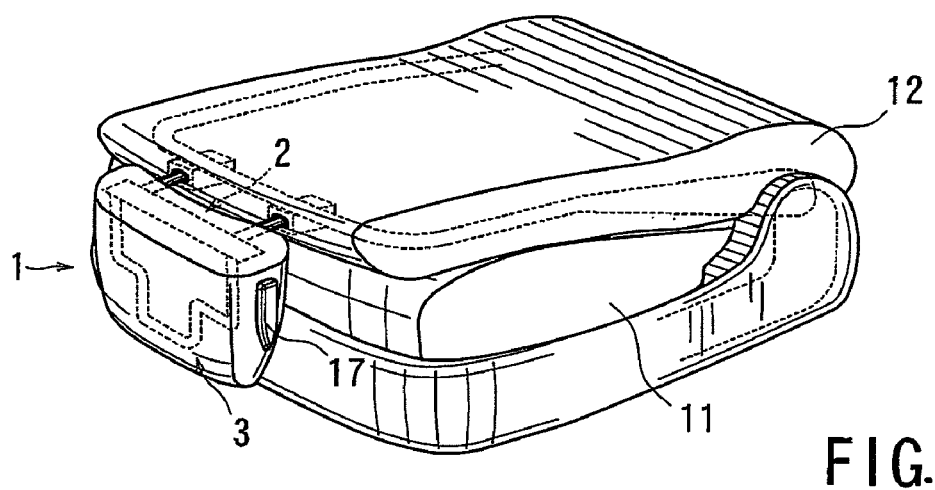
FIG. 2 is a perspective view of the vehicular seat when a seat back falls down to a front side.
Figure 3:
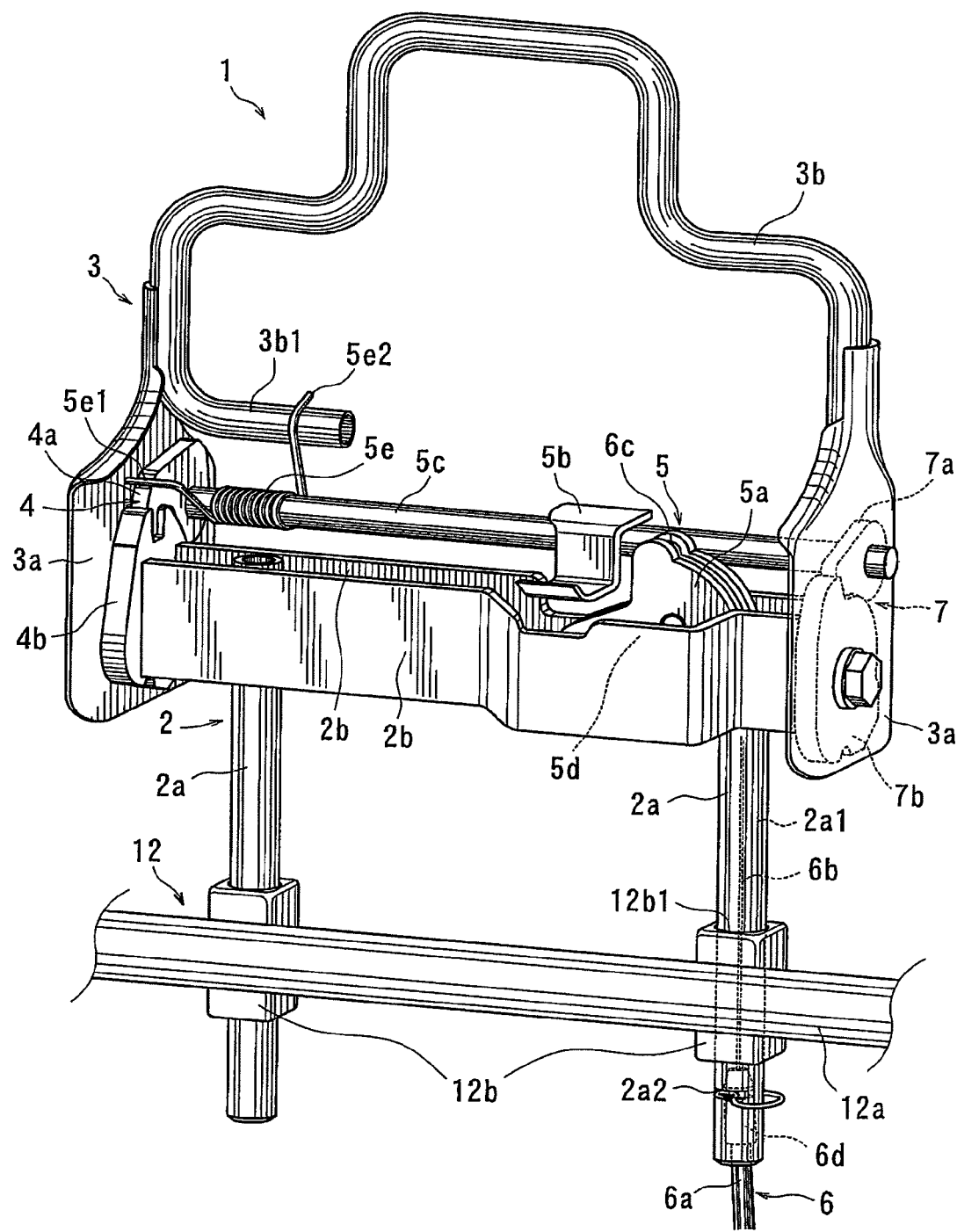
FIG. 3 is a perspective view of a framework of a headrest.

As shown in FIGS. 1 and 2, the headrest 1 includes a base member 2. A headrest main body 3 movably (inclinably) attached to the base member 2. As shown in FIG. 3, the base member 2 includes a pair of stays 2a and bridge plates 2b for connecting the pair of stays 2a. The stays 2a are formed in a tubular shape (for example, circular cylinder shape) and are slidably inserted to attaching holes 12b1 of the holders 12b. The bridge plates 2b are attached to an upper end portions of the stays 2a. The headrest main body 3 includes left and right attaching plates 3a, and a connecting pipe 3b in a tubular shape. The attaching plates 3a are attached to end portions of the bridge plates 2b. The connecting pipe 3b is extended from the left and right attaching plates 3a to an upper side.

As shown in FIG. 3, a lock apparatus 4 and a lock release apparatus 5 are provided between the base member 2 and the headrest main body 3. The lock apparatus 4 includes a lock base 4b attached to left end portions of the bridge plates 2b and a hook 4a attached to a rod 5c. The hook 4a is biased by a bias member 5e provided between the hook 4a and the connecting pipe 3b. And the hook 4a rotates with the rod 5c around the axis of the rod 5c. A front end portion of the hook 4a is locked by a recess portion of an outer peripheral portion of the lock base 4b. Thus, the headrest main body 3a is locked relative to the base member 2 at a use position.

Figure 4:
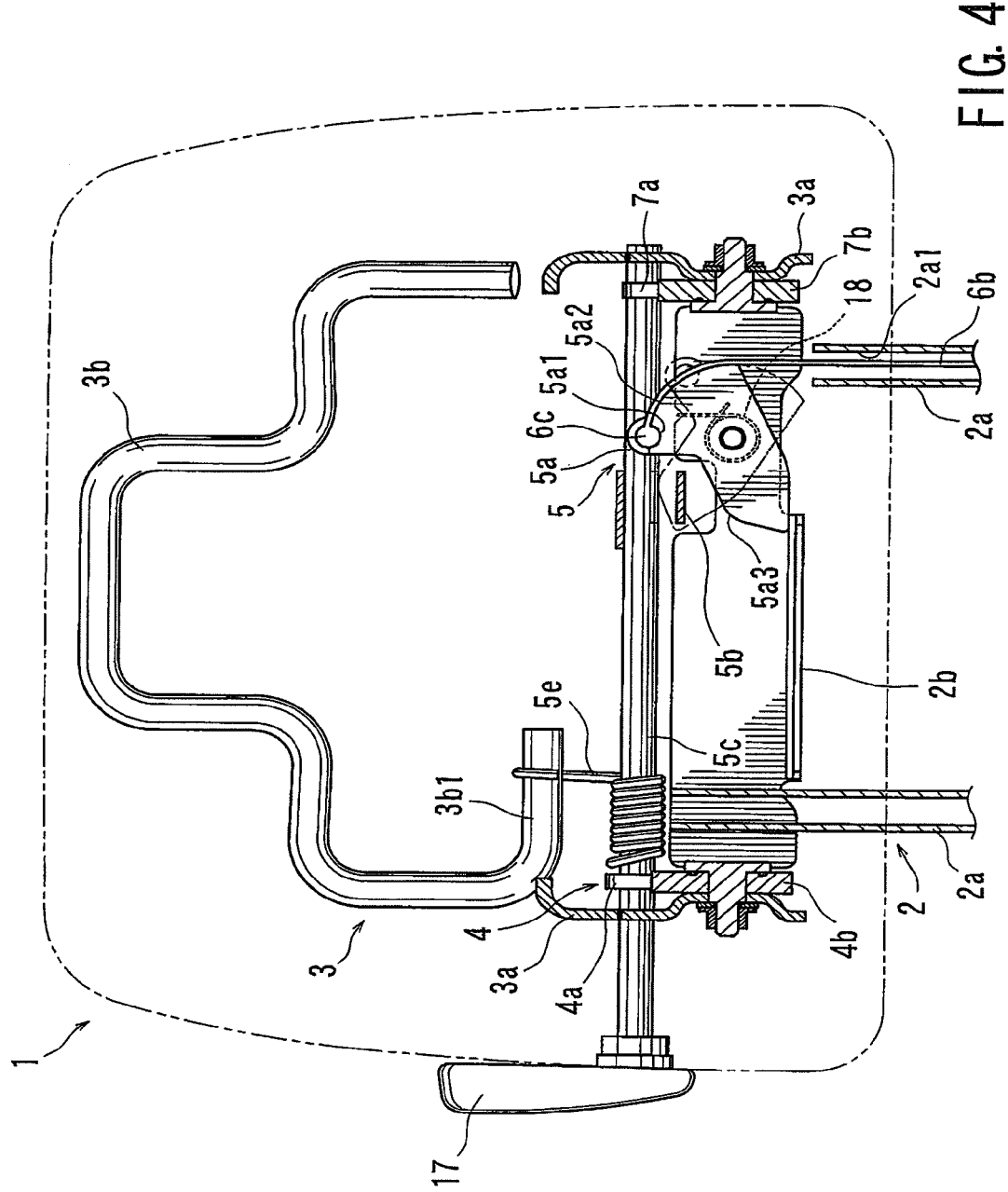
FIG. 4 is a back view of the framework of the headrest.

As shown in FIGS. 3 and 4, the lock release apparatus 5 includes a pivoting member (pulley) 5a pivotably attached to the bridge plates 2b. An outer peripheral face 5a2 of the pivoting member 5a is arranged with an inner cable 6b of a cable 6. An end portion 6c of the inner cable 6b is fitted to a connecting portion 5a1 of the pivoting member 5a. When the inner cable 6b is pulled, the pivoting member 5a is pivoted against a bias member 18 provided between the pivoting member 5a and the bridge plate 2b. A force receiving member 5b is provided at the rod 5c. A force applying portion 5a3 of the pivoting member 5a pushes up the force receiving member 5b. Thereby, the rod 5c is axially rotated, the hook 4a is rotated around the rod 5c, and the hook 4a is detached from the lock base 4b. As a result, the headrest main body 3 can move (incline/recline to a front/back side) relative to the base member 2.

Figure 5:
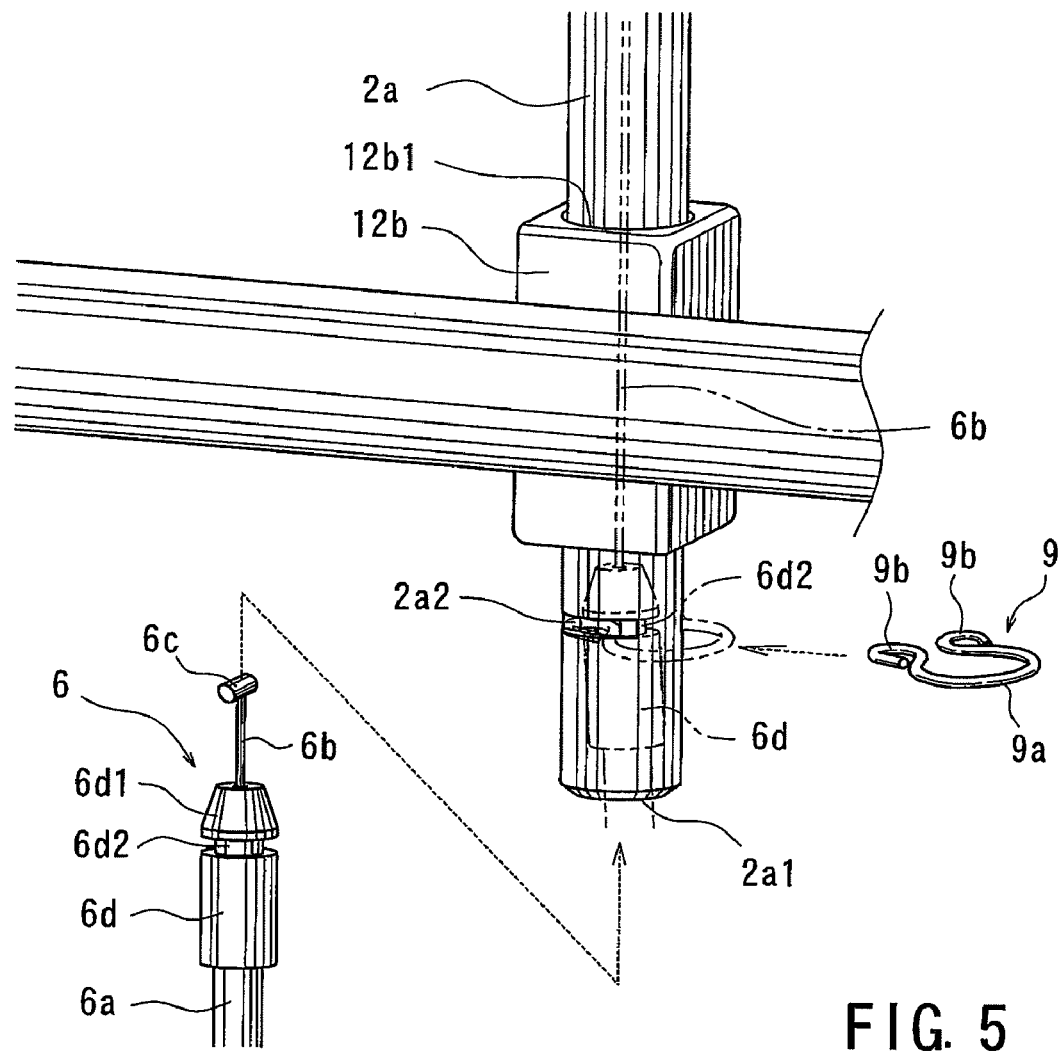
FIG. 5 is a perspective view of a stay and a cable for showing how to fix a cap to the stay.

As shown in FIG. 5, the cable 6 includes the inner cable 6b and an outer cable 6a. The outer cable 6a is constituted by a tubular shape and an end portion of the outer cable 6a is attached with a cap 6d. The outer cable 6a functions as a cover member to protect the inner cable 6b from external forces. The cap 6d can be made of a resin and includes a tip portion 6d1 in a circular cone shape. A base portion of the tip portion 6d1 is formed with a neck portion 6d2 having a small diameter. A fixing structure for fixing the cap 6d to an end portion of the stay 2a is provided between the cap 6d and the stay 2a.

Figure 6:
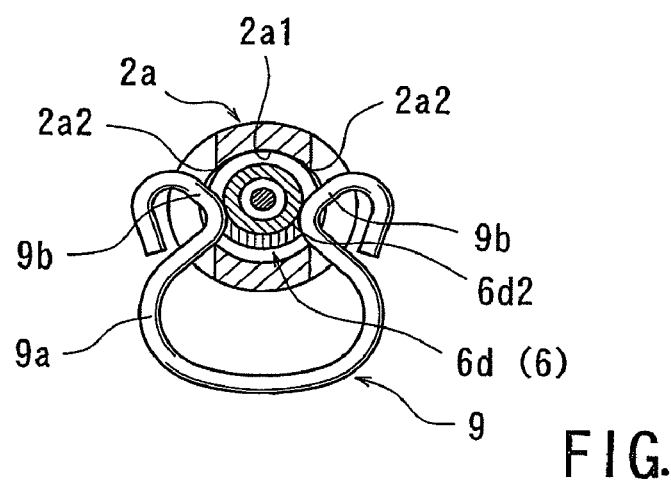
FIG. 6 is a cross-sectional view of the stay and the cap, and an upper view of a lock member.

As shown in FIGS. 5 and 6, the fixing structure includes a pair of lock holes 2a2 formed at the stay 2a and a lock member 9. The lock holes 2a2 can be formed by notching an outer peripheral face of a lower portion of the stay 2a and is penetrated from an outer peripheral face of the stay 2a to a shaft hole 2a1. The lock member (in this embodiment a snap ring) 9 is a metal wire and includes a main body 9a in a circular arc shape and lock claws 9b formed at both end portions of the main body 9a, When the cap 6d1 is fixed to the stay 2a, as shown in FIGS. 5 and 6, the cap 6d is inserted to the shaft hole 2a1 of the stay 2a. Next, the main body 9a of the lock member 9 is locked on the outer peripheral face of the stay 2a while elastically deforming the lock member 9. Further, the lock claw 9b is positioned onto the lock hole 2a2 of the stay 2a by a springing back motion the lock member 9. Thereby, a portion of the lock claw 9b is locked on the neck portion 6d2 of the cap 6d1, and the lock member 9 fixes the cap 6d to the stay 2a.

Figure 7:
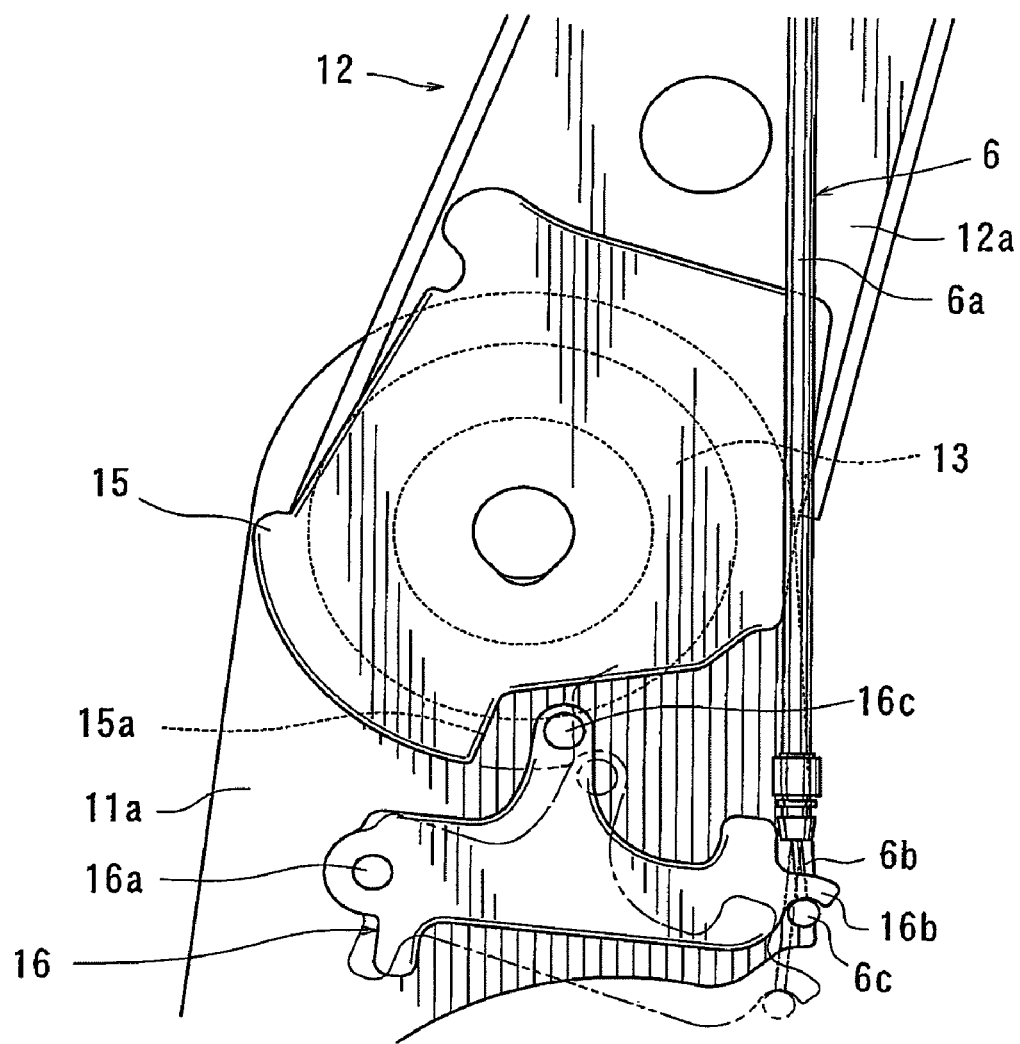
FIG. 7 is a side view of a part of a seat frame around a release link.

The cable 6 is arranged at inside of the seat back 12. One end portion of the outer cable 6a is positioned at a lower end portion of the stay 2a by way of the cap 6d as shown in FIGS. 3 and 5. The inner cable 6b extends out of the outer cable 6a and the cap 6d1, and further extends into the stay 2a. One end portion of the inner cable 6b is connected to the pivoting member 5a. Other end portion of the outer cable 6a is attached to the frame 11a as shown in FIG. 7. Other end portion of the inner cable 6b is attached to a release link 16.

As shown in FIG. 7, the release link 16 is attached to the frame 11a of the seat cushion 11. The frame 12a of the seat back 12 is attached with a kick member 15. When the seat back 12 moves to a front side, the kick member 15 is pivoted with the seat back 12 relative to the frame 11a. The kick member 15 pushes a force receiving portion 16c of the release link 16. Thereby, the release link 16 is inclined and the release link 16 pulls the inner cable 6b (as illustrated by phantom lines in FIG. 7). As a result, the lock apparatus 4 is released from locking, the headrest main body 3 is allowed to move forward relative to the base member 2.

As shown in FIGS. 1 and 2, a side portion of the headrest 1 is attached with an operating lever 17 for releasing the lock apparatus 4. As shown in FIG. 4, the operating lever 17 is attached to one end portion of the rod 5c. Therefore, by moving the operating lever 17, the rod 5c is axially rotated, the hook 4a is moved, and the lock apparatus 4 is released from locking. In this way, the headrest main body 3 can move relative to the base member 2 also by the operating lever 17.

As described above, the end portion of the outer cable 6a is attached with the cap 6d as shown in FIG. 3. The fixing structure for fixing the cap 6d to the end portion of the stay 2a is provided between the cap 6d and the end portion of the stay 2a. The inner cable 6b extends into the shaft hole 2a1 of the stay 2a by extending from the outer cable 6a.

Therefore, the end portion of the outer cable 6a is fixed to the end portion of the stay 2a. The stay 2a is provided with a rigidity for supporting the headrest 1 relative to the seat back 12. Thus, the end portion of the outer cable 6a can be fixed stably without using a bracket (or the like) similar to that previously described in the background art. Further, the end portion of the outer cable 6a can be fixed easily in comparison with the case of being fixed to inside of the headrest 1. Further, the inner cable 6b extends into the stay 2a by extending from the outer cable 6b. Therefore, an action of pulling the inner cable 6a is stabilized and an operability of the headrest 1 is promoted.

As shown in FIG. 5, the fixing structure includes the locking hole 2a2 of the stay 2a and the locking member 9. The locking member 9 includes the lock claw 9b positioned in the lock hole 2a2 and extending into the lock hole 2a2 of the cap 6d. Therefore, the fixing structure does not need a large-sized bracket (or the like) similar to that described in the background art, thereby resulting in a simple and lightweight configuration.

Another configuration according to the present invention will be described in reference to FIGS. 8 and 9. This configuration is similar to the one shown in FIGS. 5 and 6. However, FIGS. 8 and 9 includes a lock member 19 constituted by a metal plate in place of the lock member 9 shown in FIGS. 5 and 6.

Figure 8:
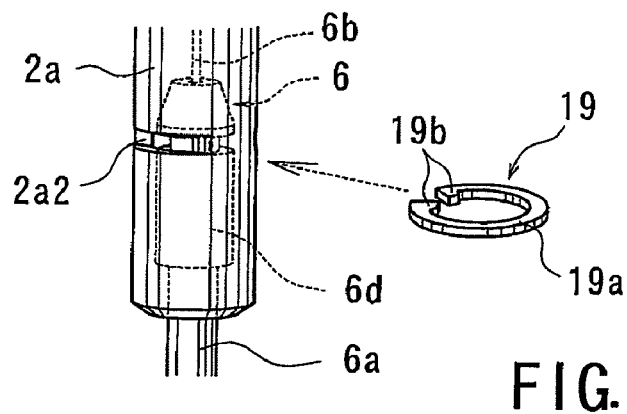
FIG. 8 is a perspective view of a stay and a cable of another configuration of the present invention for showing a fixing structure.
Figure 9:
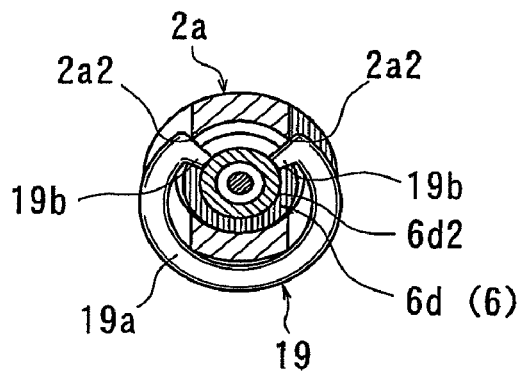
FIG. 9 is a cross-sectional view of the stay and a cap, and an upper view of a lock member of another configuration.

As shown in FIGS. 8 and 9, the lock member 19 integrally includes a main body 19a and a pair of lock claws 19b. The main body 19a has a C-like shape. The lock claws 19b are projected in towards a center of the lock member 19 on both ends of the main body 19a, When the cap 6d is fixed to the stay 2a, the main body 19a is positioned on the outer peripheral face of the stay 2a, elastically deforming the lock member 19. The lock claw 19b is projected to the lock hole 2a2 of the stay 2a by springing back the lock member 19. Thereby, a portion of the lock claw 19b locks into the neck portion 6d2 of the cap 6d and the lock member 9 fixes the cap 6d within the stay 2a.

Another configuration according to the present invention will be described in reference to FIG. 10. This configuration is similar to the one shown in FIGS. 5 and 6. However, FIG. 10 includes a cap 6e attached at an end portion of the outer cable 6a.

Figure 10:
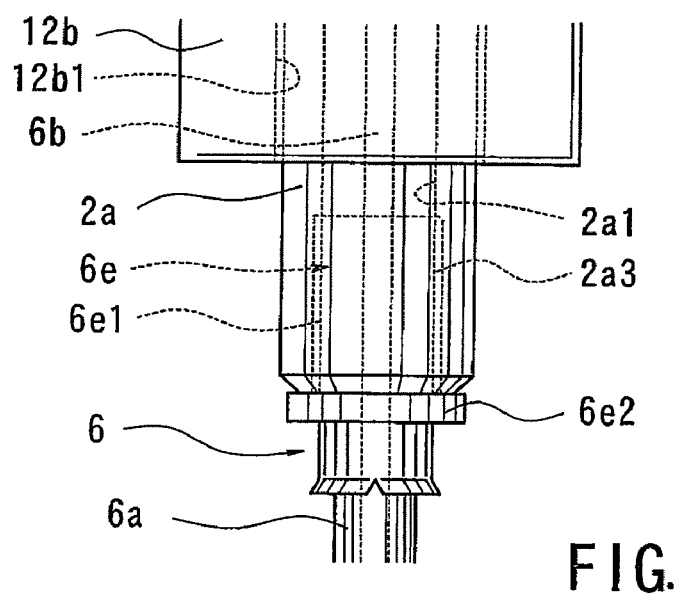
FIG. 10 is a front view of a fixing structure of the other configuration of the present invention.

As shown in FIG. 10, the cap 6e includes a male screw portion 6e1 at an outer peripheral face of a tip end portion and includes a flange portion 6e2 at a base end portion. The stay 2a includes a female screw portion 2a3 at an inner peripheral face of the shaft hole 2a1, and the cap 6e is screwed to the female screw portion 2a3. A diameter of the flange portion 6e2 is larger than a diameter of the shaft hole 2a1 of the stay 2a. Therefore, by screwing the cap 6e to the stay 2a, the cap 6e can be fixed to the stay 2a by the flange portion 6e2.

As described above, the fixing structure includes the male screw portion 6e1 formed at the outer peripheral face of the cap 6d and the female screw portion 2a3 formed at the inner peripheral face of the stay 2a. Therefore, the fixing structure has a simple and lightweight configuration as compared to the large-sized bracket (or the like) as that of the previously described background art.

The seat back is provided with the holder 12b having attaching hole 12b1 into which the stay 2a is movably inserted as shown in FIG. 10. Further, a diameter of the cap 6e is set to be smaller than a diameter of the attaching hole 12b1. Therefore, the cap 6e can be moved relative to the attaching hole 12b1 of the holder 12b along with the stay 2a. Therefore, a portion of the headrest relative to the seat back is not restricted by the cap 6e.

While the invention has been described with reference to specific configurations, it will be apparent to those skilled in the art that many alternatives, modifications and variations may be made. Accordingly, the present invention is intended to embrace all such alternatives, modifications and variations that may fall within the spirit and scope of the appended claims. For example, the present invention should not be limited to the representative configurations, but may be modified as described below.

(1) In FIGS. 1 and 2, the headrest 1 is of a configuration of moving the headrest main body 3 forward relative to the base member 2. However, it can be configured in a way that the headrest main body moves backward to the base member to a rear side.

(2) In FIGS. 1 and 2, the headrest 1 is of a configuration of inclining the headrest main body 3 relative to the base member 2. However, it can be configured in a way that the headrest main body moves in a forward direction relative to the base member. For example, the present invention can include an "active headrest" wherein the headrest main body moves towards a head of a passenger as a vehicle collision (or the like) occurs.

(3) In FIGS. 6 and 9, the stays 2a include the pair of lock holes 2a2. However, it can be configured in a way that one or three or more of the locking holes are provided and the locking members include the lock claws of a number in correspondence with that of the lock holes.

This invention claims:

1. A headrest for a vehicular seat, the headrest comprising:
a base member including a stay connected to a seat back;
a headrest main body movably attached to the base member;
a cable positioned within the stay and seat back;
a cap positioned proximate the cable and the stay; and
a fixing structure capable of fixing the cap to an end portion of the stay, wherein:
the fixing structure includes a male screw portion formed at an outer peripheral face of the cap and a female screw portion formed at an inner peripheral face of the stay, and
the male screw portion is screwed to the female screw portion.

2. The headrest for a vehicular seat as in claim 1, wherein a side of the seat back is provided with a holder having an attaching hole into which the stay is movably inserted, and a diameter of the cap is set to be smaller than a diameter of the attaching hole.

3. A headrest for a vehicular seat, the headrest comprising:
a base member including a stay connected to a seat back;
a headrest main body movably attached to the base member; and
a cable being pulled when the headrest main body is moved relative to the base member, wherein:
the cable includes an outer cable and an inner cable extending from the outer cable;
the outer cable includes a cap at an end portion;
the cap is fixed to an end portion of the stay by a fixing structure; and
the inner cable extends into a shaft hole of the stay and is moved relative to the outer cable and the stay by being pulled when the headrest main body is moved, and wherein:
the fixing structure includes a male screw portion formed at an outer peripheral face of the cap and a female screw portion formed at an inner peripheral face of the stay, and
the male screw portion is screwed to the female screw portion.

4. The headrest for a vehicular seat as in claim 3, wherein:
a side of the seat back is provided with a holder having an attaching hole into which the stay is movably inserted, and
a diameter of the cap is set to be smaller than a diameter of the attaching hole.

5. A headrest for a vehicular seat, the headrest comprising:
a base member including a stay connected to a seat back;
a headrest main body movably attached to the base member; and
a cable being pulled when the headrest main body is moved relative to the base member, wherein:
the cable includes an outer cable and an inner cable extending from the outer cable;
the outer cable includes a cap at an end portion;
the cap is fixed to an end portion of the stay by a fixing structure; and
the inner cable extends into a shaft hole of the stay and is moved relative to the outer cable and the stay by being pulled when the headrest main body is moved, and wherein:
the fixing structure includes a lock hole defining an outer peripheral face of the stay extending to the shaft hole of the stay and a lock member mounted to the outer peripheral face of the stay, and
the lock member includes a lock claw projecting into the lock hole to lock the cap inserted to the shaft hole.

6. A headrest for a vehicular seat, the headrest comprising:
a base member including a stay connected to a seat back;
a headrest main body movably attached to the base member;
a cable positioned within the stay and seat back;
a cap positioned proximate the cable and the stay; and
a fixing structure capable of fixing the cap to an end portion of the stay, wherein:
the fixing structure includes a lock member and a lock hole formed at the stay, and
the lock member is able to engage the cap via the lock hole.

7. The headrest for a vehicular seat as in claim 6, wherein the cap includes a neck portion.

8. The headrest for a vehicular seat as in claim 7, wherein the cap further includes a tip portion adjacent the neck portion, further wherein the neck portion has a smaller diameter than the tip portion.

9. The headrest for a vehicular seat as in claim 7, wherein the lock member includes a lock claw extending toward a center of the lock member.

10. The headrest for a vehicular seat as in claim 9, wherein the lock claw is able to engage the neck portion of the cap.

* * * * *